US012580624B2

(12) United States Patent (10) Patent No.: US 12,580,624 B2
Bahadori et al. (45) Date of Patent: Mar. 17, 2026

(54) DYNAMIC SPLIT COMPUTING FOR BEAMFORMING

(71) Applicant: Cisco Technology, Inc., San Jose, CA (US)

(72) Inventors: Niloofar Bahadori, Greensboro, NC (US); Peiman Amini, Fremont, CA (US); Ardalan Alizadeh, Campbell, CA (US); Robert E. Barton, Richmond (CA); Juan Carlos Zuniga, Montreal (CA)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 18/597,685

(22) Filed: Mar. 6, 2024

(65) Prior Publication Data

US 2025/0211303 A1      Jun. 26, 2025

Related U.S. Application Data

(60) Provisional application No. 63/614,510, filed on Dec. 22, 2023.

(51) Int. Cl.
*H04B 7/06*          (2006.01)
(52) U.S. Cl.
CPC ......... *H04B 7/0626* (2013.01); *H04B 7/0617* (2013.01); *H04B 7/0639* (2013.01)
(58) Field of Classification Search
CPC ... H04B 7/0626; H04B 7/0617; H14B 7/0639
See application file for complete search history.

(56) References Cited

U.S. PATENT DOCUMENTS

| | | | |
|---|---|---|---|
| 12,273,278 B2 * | 4/2025 | Djuhera | H04L 41/16 |
| 2021/0034582 A1 * | 2/2021 | Liu | G06F 16/212 |

(Continued)

FOREIGN PATENT DOCUMENTS

| | | |
|---|---|---|
| WO | 2022271564 A1 | 12/2022 |
| WO | 2023040618 A1 | 3/2023 |
| WO | 2023196794 A1 | 10/2023 |

OTHER PUBLICATIONS

Bakhtiarnia A., et al., "Dynamic Split Computing for Efficient Deep Edge Intelligence", ICASSP 2023—2023 IEEE International Conference on Acoustics, Speech and Signal Processing (ICASSP), Jun. 4-10, 2023, 5 Pages.

(Continued)

*Primary Examiner* — Jaison Joseph
(74) *Attorney, Agent, or Firm* — Patterson + Sheridan, LLP

(57) ABSTRACT

The present disclosure describes a wireless network that dynamically divides the computation of a beamforming feedback matrix between devices and access points. According to an embodiment, an access point includes an antenna, one or more memories, and one or more processors communicatively coupled to the one or more memories. A combination of the one or more processors determines a first number of layers of a neural network to be implemented by a device and instructs the device to implement the first number of layers of the neural network. The combination of the one or more processors also receives, from the device, intermediate CSI produced by the first number of layers of a neural network implemented by the device, applies, to the intermediate CSI, a second number of layers of the neural network to produce a beamforming feedback matrix, and adjusts the antenna based on the beamforming feedback matrix.

17 Claims, 8 Drawing Sheets

(56) References Cited

U.S. PATENT DOCUMENTS

| | | | |
|---|---|---|---|
| 2021/0042889 A1* | 2/2021 | Pei | G06N 3/063 |
| 2021/0345134 A1* | 11/2021 | Ottersten | H04W 16/22 |
| 2022/0311678 A1* | 9/2022 | Karjee | G06N 3/0464 |
| 2022/0338189 A1* | 10/2022 | Madadi | H04B 17/3913 |
| 2022/0383116 A1* | 12/2022 | Karjee | G06N 3/045 |
| 2023/0103220 A1 | 3/2023 | Pezeshki et al. | |
| 2023/0421223 A1* | 12/2023 | Li | H04B 17/3913 |
| 2024/0137287 A1* | 4/2024 | Pack | H04L 41/16 |
| 2024/0305504 A1* | 9/2024 | Bar-Or Tillinger | H04L 25/0242 |
| 2024/0370760 A1* | 11/2024 | Muhammad | G06N 20/00 |
| 2025/0039019 A1* | 1/2025 | Han | H04L 25/0254 |
| 2025/0055537 A1* | 2/2025 | Kim | H04B 7/0626 |
| 2025/0132800 A1* | 4/2025 | Kyung | H04L 5/0048 |

OTHER PUBLICATIONS

Matsubara Y., et al., "BottleFit: Learning Compressed Representations in Deep Neural Networks for Effective and Efficient Split Computing", 2022 IEEE 23rd International Symposium on a World of Wireless, Mobile and Multimedia Networks (WoWMoM), Jun. 14-17, 2022, pp. 337-346.

Peken T., et al., "Deep Learning for SVD and Hybrid Beamforming", IEEE Transactions on Wireless Communications, vol. 19, No. 10, Oct. 2020, pp. 6621-6642.

* cited by examiner

<u>100</u>

102

Beamforming

Layers

Intermediate CSI

104

Device

102/104

700

DYNAMIC SPLIT COMPUTING FOR BEAMFORMING

CROSS-REFERENCE TO RELATED APPLICATIONS

This application claims benefit of U.S. provisional patent application Ser. No. 63/614,510 filed Dec. 22, 2023. The aforementioned related patent application is herein incorporated by reference in its entirety.

TECHNICAL FIELD

Embodiments presented in this disclosure generally relate to wireless communication. More specifically, embodiments disclosed herein dynamic split computing for beamforming in a wireless network (e.g., a wireless fidelity (WiFi) network).

BACKGROUND

Existing wireless networks use beamforming to improve signal quality between devices (e.g., between access points and devices in a WiFi network). Typically, in WiFi networks, a device is responsible for determining channel state information (CSI) for a channel between the device and the access point. The device then uses the CSI to determine a beamforming feedback matrix for the access point. The access point uses the information from the device to perform beamforming. Determining the beamforming feedback matrix, however, may be computationally expensive, especially as the number of antennas in access points and devices continue to increase over time. Airtime overhead also increases as the computation becomes more complex.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
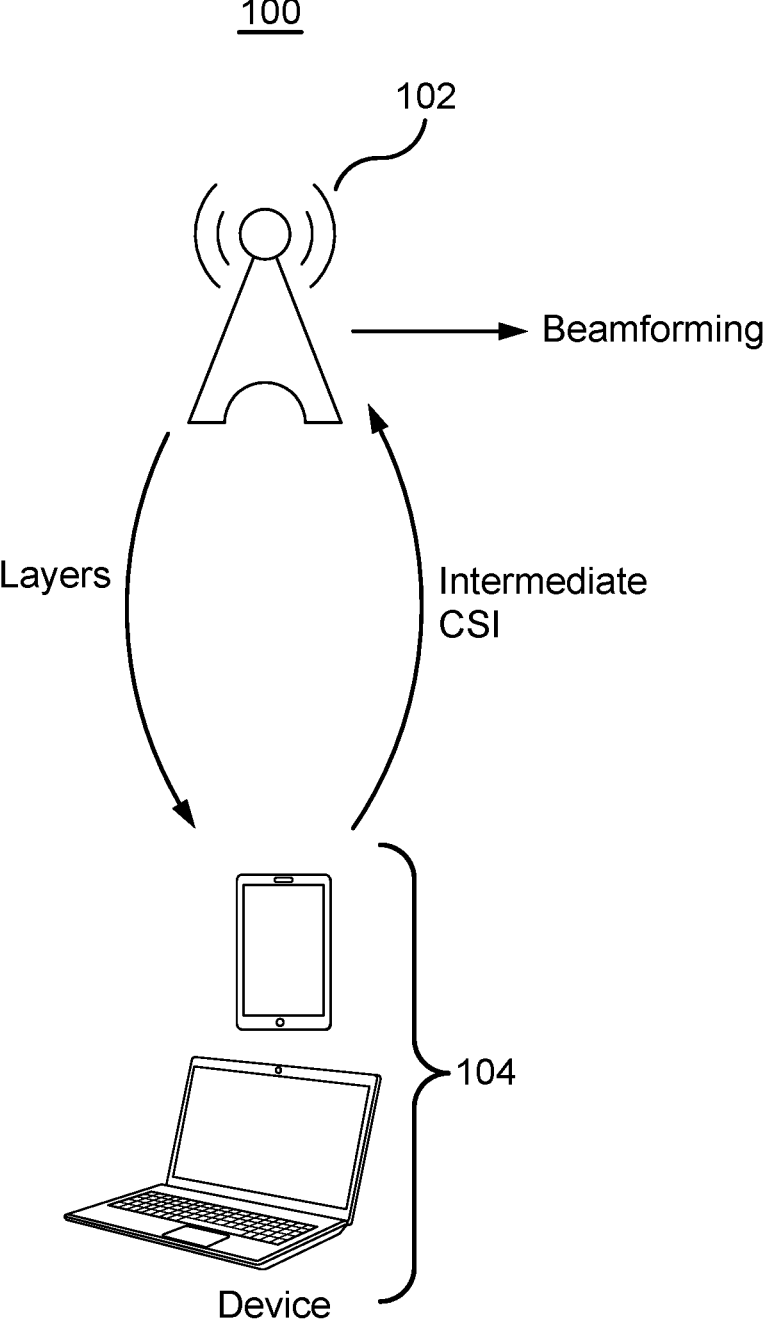
FIGS. 1A and 1B illustrate an example system.

The present disclosure describes a wireless network that dynamically divides the computation of a beamforming feedback matrix between devices and access points.

According to an embodiment, an access point includes an antenna, one or more memories, and one or more processors communicatively coupled to the one or more memories. A combination of the one or more processors determines a first number of layers of a neural network to be implemented by a device and instructs the device to implement the first number of layers of the neural network. The combination of the one or more processors also receives, from the device, intermediate CSI produced by the first number of layers of a neural network implemented by the device, applies, to the intermediate CSI, a second number of layers of the neural network to produce a beamforming feedback matrix, and adjusts the antenna based on the beamforming feedback matrix.

According to another embodiment, a method includes determining, by an access point, a first number of layers of a neural network to be implemented by a device and instructing, by the access point, the device to implement the first number of layers of the neural network. The method also includes receiving, from the device, intermediate CSI produced by the first number of layers of a neural network implemented by the device, applying, by the access point and to the intermediate CSI, a second number of layers of the neural network to produce a beamforming feedback matrix, and adjusting, by the access point, an antenna based on the beamforming feedback matrix.

According to another embodiment, a system includes a device and an access point. The access point determines a first number of layers of a neural network to be implemented by the device and instructs the device to implement the first number of layers of the neural network. The device applies the first number of layers of the neural network to CSI for a communication channel between the device and the access point to produce intermediate CSI and communicates the intermediate CSI to the access point. The access point applies, to the intermediate CSI, a second number of layers of the neural network to produce a beamforming feedback matrix and adjusts an antenna of the access point based on the beamforming feedback matrix.

EXAMPLE EMBODIMENTS

The present disclosure describes a wireless network (e.g., a WiFi network) in which an access point dynamically divides the computation of a beamforming feedback matrix between the access point and a device. Generally, the access point determines the anticipated size of a CSI matrix for a communication channel between the access point and the device (e.g., based on the number of antennas in the access point and the device), and the device informs the access point of the computational resources available in the device. The access point then determines how many layers of a neural network should be implemented by the device and how many layers of the neural network should be implemented by the access point. The device uses its number of layers to analyze CSI to produce intermediate (or compressed) CSI for the access point. The access point uses its number of layers to analyze the intermediate CSI to produce the beamforming feedback matrix. The access point may then adjust antennas based on the beamforming feedback matrix.

In some embodiments, the network provides several technical advantages. For example, the device may be tasked with implementing a number of layers of the neural network that the device's computation power can handle. As another example, overtime airhead may be reduced relative to existing networks because the amount of information being communicated between the access point and the device may be reduced.

FIG. 1A illustrates an example system 100, which may be a wireless network (e.g., a WiFi network). As seen in FIG. 1A, the system 100 includes one or more access points 102 and one or more devices 104. Generally, the device 104 connects to the access point 102. The access point 102 provides network coverage for the system 100. The access point 102 communicates messages to the device 104 and directs messages from the device 104 towards their destination.

The access point 102 facilitates wireless communication (e.g., WiFi communication) in the system 100. One or more devices 104 may connect to the access point 102. The access point 102 may then facilitate wireless communication for the connected devices 104. For example, the access point 102 may transmit messages to a connected device 104. As another example, the access point 102 may receive messages transmitted by the device 104. The access point 102 may then direct that message towards its intended destination.

The device 104 may be any suitable device that wirelessly connects to the access point 102. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user. The device 104 may include a hardware processor, memory, or circuitry configured to perform any of the functions or actions of the device 104 described herein. For example, a software application designed using software code may be stored in the memory and executed by the processor to perform the functions of the device 104.

The access point 102 may perform beamforming to improve communication quality between the access point 102 and the device 104. The access point 102 determines a location or direction of the device 104 relative to the access point 102. The access point 102 then forms and directs a beam (a stronger signal) in that direction or towards that location. In some existing networks, beamforming involves the devices performing channel estimation (e.g., based on null data packets sent back the access points for channel sounding) to estimate a channel matrix (which may also be referred to as a CSI matrix) and then using artificial intelligence (e.g., neural networks) to determine a beamforming feedback matrix from the channel matrix. The devices may then compress and communicate the beamforming feedback matrix to the access points, which use that information to adjust the access points' antennas for beamforming towards the devices. As the number of antennas in the access points and devices increases, however, so does the size of the channel matrix and the beamforming feedback matrix. As a result, the computational resources needed to determine the beamforming feedback matrix and the network resources needed to communicate the beamforming feedback matrix increases.

The access point 102 reduces the computational resources and network resources needed to perform beamforming relative to existing networks by dynamically splitting the computational tasks between the access point 102 and the device 104. Generally, the device 104 may inform the access point 102 of the computational resources available in the device 104, and the access point 102 may also estimate or determine the size of the CSI matrix (e.g., using the number of antennas in the access point 102 and in the device 104). The access point 102 uses this information to determine the number of layers of a neural network that the device 104 should be able to implement. The access point 102 communicates the number of layers of the neural network to the device 104. The device 104 uses those layers of the neural network to determine intermediate CSI. The device 104 communicates the intermediate CSI to the access point 102, which uses the remaining layers of the neural network to determine the beamforming feedback matrix from the intermediate CSI. In this manner, the access point 102 reduces the computational load on the device 104 to accommodate the available computational resources in the device 104. Additionally, the access point 102 may reduce the load on the network by reducing the amount of information transmitted over the network between the access point 102 and the device 104 to implement beamforming.

Figure 1B:
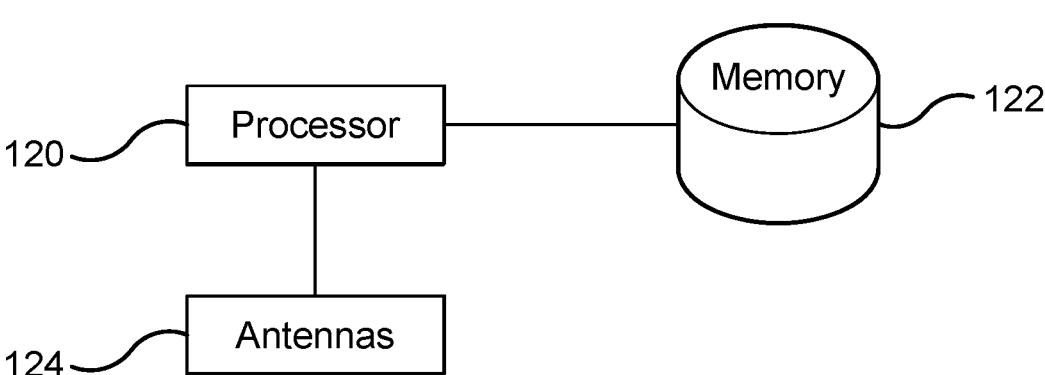

FIG. 1B illustrates an example access point 102 or device 104 in the system 100 of FIG. 1A. As seen in FIG. 1B, the access point 102 or device 104 includes a processor 120, a memory 122, and one or more antennas 124.

The processor 120 is any electronic circuitry, including, but not limited to one or a combination of microprocessors, microcontrollers, application specific integrated circuits (ASIC), application specific instruction set processor (ASIP), and/or state machines, that communicatively couples to the memory 122 and controls the operation of the access point 102 and/or device 104. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the access point 102 and/or device 104 by processing information (e.g., information received from the memory 122 and antennas 124). The processor 120 is not limited to a single processing device and may encompass multiple processing devices contained in the same device or computer or distributed across multiple devices or computers. The processor 120 is considered to perform a set of functions or actions if the multiple processing devices collectively perform the set of functions or actions, even if different processing devices perform different functions or actions in the set.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein. The memory 122 is not limited to a single memory and may encompass multiple memories contained in the same device or computer or distributed across multiple devices or computers. The memory 122 is considered to store a set of data, operational software, or information if the multiple memories collectively store the set of data, operational software, or information, even if different memories store different portions of the data, operational software, or information in the set.

The antennas 124 may communicate messages or information using different communication technologies. For example, the access point 102 and/or device 104 may use one or more of the antennas 124 for WiFi communications. The access point 102 and/or device 104 may use one or more of the antennas 124 to transmit messages and one or more of the antennas 124 to receive messages. The access point 102 and/or device 104 may include any number of antennas 124 to communicate using any number of communication technologies.

Figure 2:
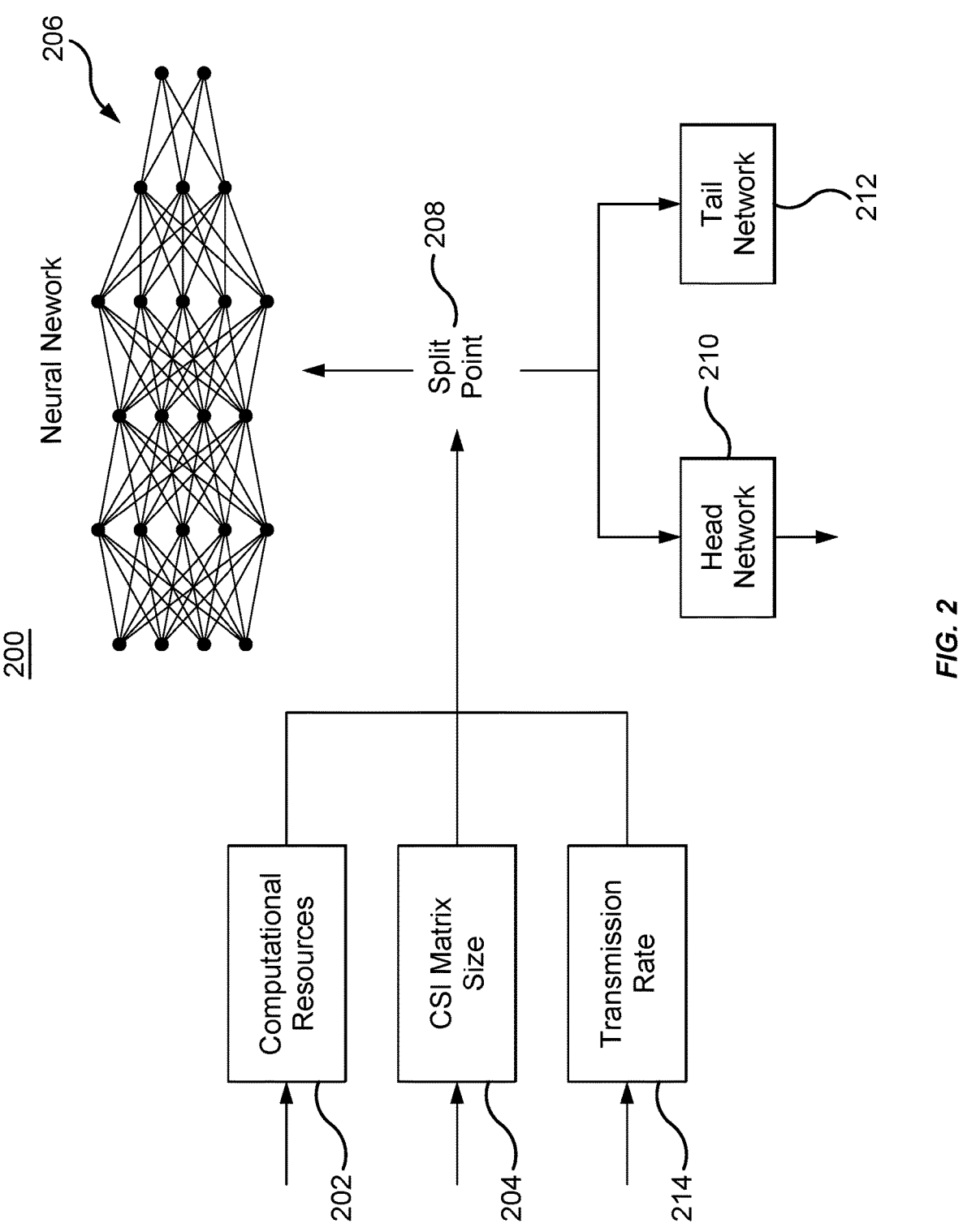
FIG. 2 illustrates an example operation performed by the system of FIG. 1A.

FIG. 2 illustrates an example operation 200 performed by the system 100 of FIG. 1A. Generally, the access point 102 performs the operation 200. By performing the operation 200, the access point 102 determines the number of layers of a neural network that the device 104 should implement.

The access point 102 receives an indication from the device 104 of the computational resources 202 available to the device 104. The computational resources 202 may include processor resources, memory resources, and/or network resources that are available for the device 104 to use. As the device 104 initiates or performs different tasks, the computational resources 202 available to the device 104 may change. For example, if the device 104 initiates or performs many tasks, then the computational resources 202 available to the device 104 may decrease. The device 104 may update the access point 102 of the computational resources 202 available to the device 104 as the amount of available computational resources 202 changes.

The access point 102 may determine a size 204 of a CSI matrix for the access point 102 and the device 104. For example, the device 104 may inform the access point 102 of the number of antennas 124 in the device 104. The access point 102 may also know the number of antennas 124 in the access point 102. Using this information, the access point 102 may determine the size 204 of the CSI matrix for the access point 102 and the device 104. Generally, the size 204 of the CSI matrix increases as the number of antennas 124 in the access point 102 or device 104 increases.

The access point 102 may then use the computational resources 202 available to the device 104 and the size 204 of the CSI matrix to split or divide a neural network 206. The neural network 206 may be used to determine a beamforming feedback matrix from a CSI matrix. In existing networks, the device 104 may implement the neural network 206 to determine the beamforming feedback matrix. To reduce the computational load on the device 104 and the load on the network, the access point 102 may divide the neural network 206 based on the computational resources

202 available to the device 104 and the size 204 of the CSI matrix. The access point 102 determines a split point 208 for the neural network 206 using the computational resources 202 available to the device 104 and the size 204 of the CSI matrix. Generally, as the computational resources 202 available to the device 104 decreases and/or as the size 204 of the CSI matrix increases, the access point 102 may determine the split point 208 that reduces the number of layers of the neural network 206 that the device 104 implements. The split point 208 may set a number of layers of the neural network 206 that the device 104 implements. The access point 102 may implement the remaining layers of the neural network 206.

The access point 102 divides the neural network 206 according to the split point 208 to produce a head network 210 and a tail network 212. The head network 210 may include the layers of the neural network 206 from the first layer to the split point 208. The tail network 212 may include the layers of the neural network 206 from the split point 208 to the end of the neural network 206. As a result, the sum of the number of layers in the head network 210 and the number of layers in the tail network 212 is the total number of layers in the neural network 206. The access point 102 then communicates the head network 210 to the device 104 so that the device 104 implements the head network 210. The access point 102 may implement the tail network 212. The access point 102 may split the neural network 206 in any manner so that the head network 210 and the tail network 212 include any number of layers. For example, the head network 210 may implement more layers than the tail network 212, or the head network 210 may implement fewer layers than the tail network 212.

In some embodiments, the access point 102 also considers a transmission rate 214 of the network between the access point 102 and the device 104 when determining the split point 208. The transmission rate 214 may indicate an existing load on the network. An increase in the transmission rate 214 may indicate that the network has sufficient resources to accommodate larger data transmissions. Generally, as the transmission rate 214 increases, the access point 102 may determine the split point 208 so that the device 104 implements more layers of the neural network 206.

As an example, the access point 102 may determine an amount of time ($T_i$) it takes for the device 104 to return the intermediate CSI output from the tail network 212 to the access point 102. This amount of time may be expressed as a sum of the processing time at the device 104 ($T_d$) and the transmission airtime ($T_t$). $T_t$ may be expressed as the product of the CSI matrix size 204 (D) and the size of the intermediate CSI from the device 104 ($c_i$) divided by the transmission rate 214 ($r$). To find the split point 208, the access point 102 run an optimization to minimize $T_i$.

Figure 3:
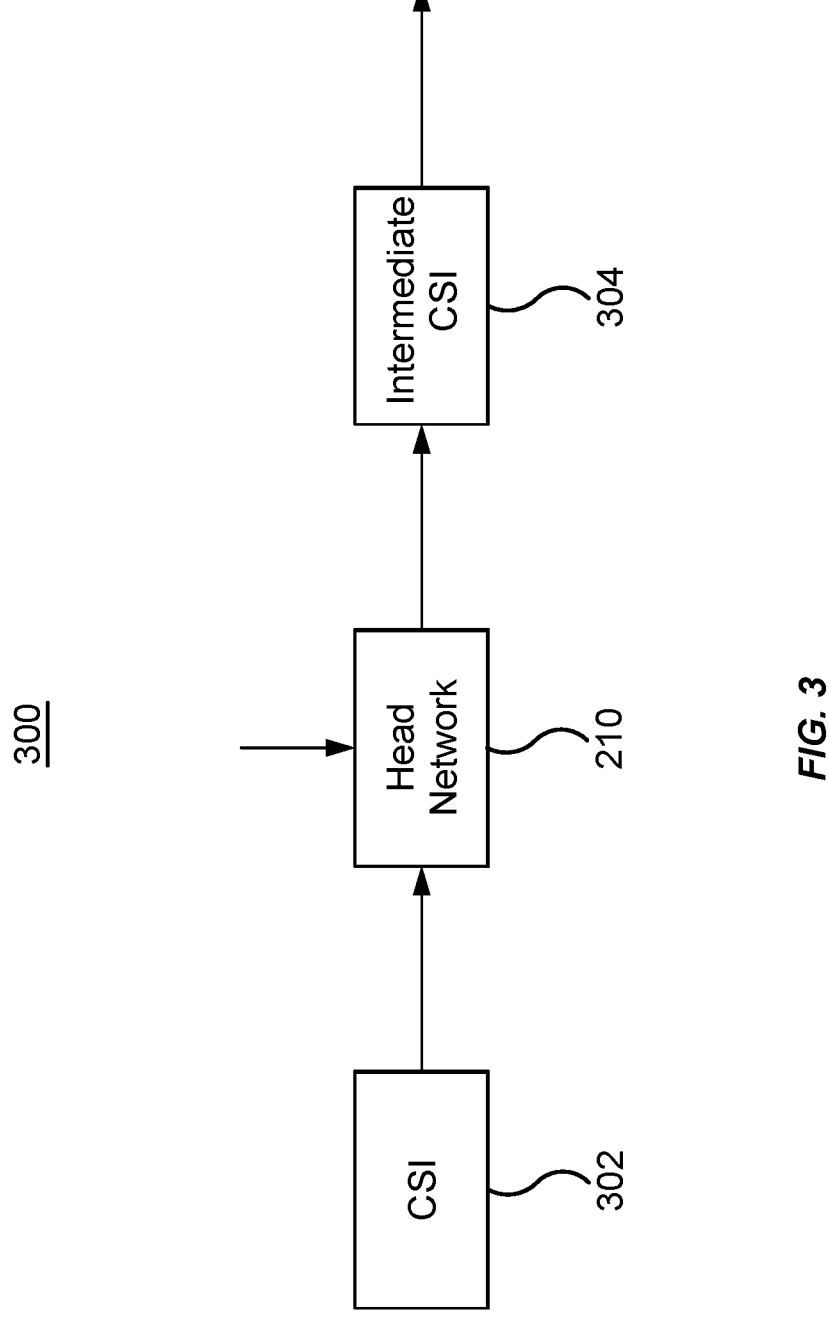
FIG. 3 illustrates an example operation performed by the system of FIG. 1A.

FIG. 3 illustrates an example operation 300 performed by the system 100 of FIG. 1A. Generally, the device 104 performs the operation 300. By performing the operation 300, the device 104 implements the head network 210 to generate intermediate CSI.

The device 104 begins by determining CSI 302 for the communication medium between the access point 102 and the device 104. For example, the access point 102 may perform channel sounding by sending null data packets to the device 104. The device 104 may receive the null data packets and collect information about the communication medium between the access point 102 and the device 104 from the received null data packets. The collected information may form the CSI 302. The CSI 302 may describe how signals propagate between the access point 102 and the device 104. The device 104 may use the CSI 302 to form a CSI matrix.

The device 104 receives the head network 210 from the access point 102. The head network 210 may include a number of initial layers of the neural network 206. The device 104 inputs the CSI matrix into the head network 210. The head network 210 may analyze the CSI matrix to produce intermediate CSI 304. The intermediate CSI 304 may not be the beamforming feedback matrix that is used to perform beamforming between the access point 102 and the device 104. Rather, the intermediate CSI 304 may be an output of the initial layers of the neural network 206 embodied by the head network 210. The device 104 communicates the intermediate CSI 304 back to the access point 102.

In some embodiments, the access point 102 and the device 104 improve the security of communications between the access point 102 and the device 104 by using the intermediate CSI 304 rather than communicating the beamforming feedback matrix between the access point 102 and the device 104. For example, if a malicious user intercepted and manipulated the beamforming feedback matrix, the malicious user may undesirably control the antennas 124 of the access point 102 and/or the device 104. By communicating the intermediate CSI 304 rather than the beamforming matrix, even if the intermediate CSI 304 were intercepted, the malicious user may not understand how to interpret or manipulate the intermediate CSI 304 to control the antennas 124 of the access point 102 of the device 104.

Figure 4:
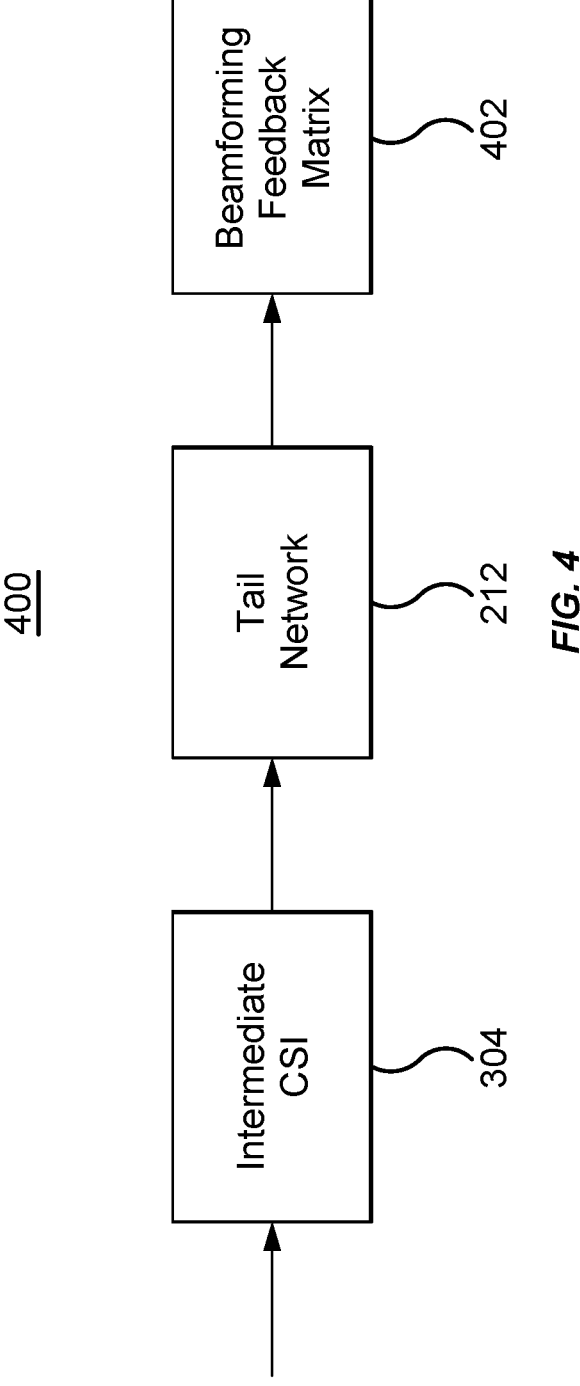
FIG. 4 illustrates an example operation performed by the system of FIG. 1A.

FIG. 4 illustrates an example operation 400 performed by the system 100 of FIG. 1A. Generally, the access point 102 performs the operation 400. By performing the operation 400, the access point 102 generates a beamforming feedback matrix.

The access point 102 receives the intermediate CSI 304 from the device 104. The device 104 generated the intermediate CSI 304 using the head network 210 of the neural network 206. The access point 102 applies the tail network 212 of the neural network 206 to the intermediate CSI 304. The tail network 212 may include the remaining layers of the neural network 206 that were not included in the head network 210. By applying the tail network 212 to the intermediate CSI, the access point 102 completes the operation of the neural network 206.

The tail network 212 analyzes the intermediate CSI 304 to produce a beamforming feedback matrix 402. The beamforming feedback matric 402 may indicate how the access point 102 should configure the antennas 124 of the access point 102 to form a beam directed towards the device 104. As a result, the access point 102 shares some of the computational load for calculating or determining the beamforming feedback matrix 402 with the device 104. Specifically, the device 104 implements the head network 210 that performs some of the initial calculations or operations. The results of those initial calculations or operations are then sent to the access point 102, which implements the tail network 212. The access point 102 uses the tail network 212 to perform the remaining calculations or operations of the neural network 106 to produce the beamforming feedback matrix 402.

Figure 5:
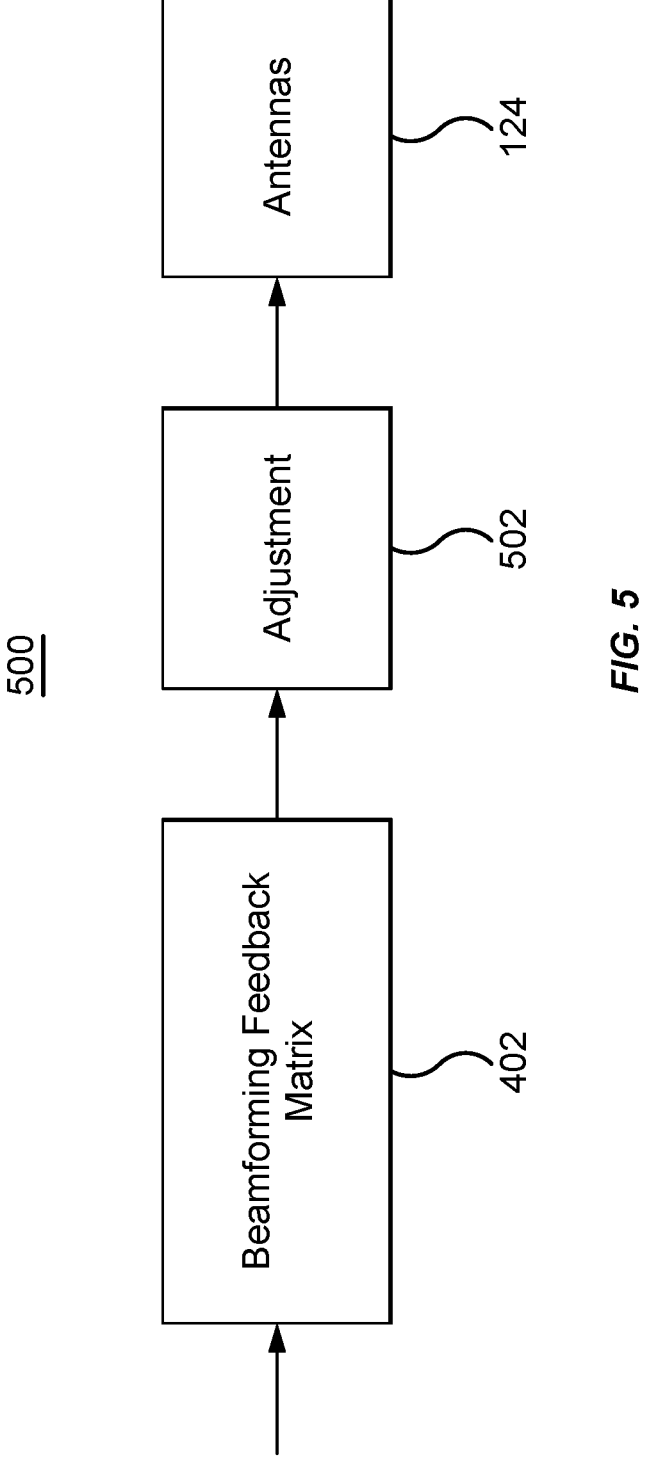
FIG. 5 illustrates an example operation performed by the system of FIG. 1A.

FIG. 5 illustrates an example operation 500 performed by the system 100 of FIG. 1A. Generally, the access point 102 performs the operation 500. By performing the operation 500, the access point 102 adjusts the antennas 124 using the beamforming feedback matrix 402.

The access point 102 determines the beamforming feedback matrix 402. For example, the access point 102 may apply the tail network 212 to the intermediate CSI 304 from the device 104 to produce the beamforming feedback matrix 402. The beamforming feedback matrix 402 may indicate how the access point 102 should configure the antennas 124 of the access point 102 to form a beam directed towards the device 104.

The access point 102 determines an adjustment 502 from the beamforming feedback matrix 402. The adjustment 502 may include adjustments to the antennas 124 of the access point 102. For example, the adjustment 502 may indicate changes to the phase or relative amplitudes of the transmissions of the antennas 124. The adjustment 502 may also indicate changes to the orientation or directions of the antennas 124. By changing the phase of signals, the relative amplitudes of signals, and/or the direction or orientation of the antennas 124, the access point 102 may use the antennas 124 to form a beam directed towards the device 104. The access point 102 applies the adjustment 502 to the antennas 124 to form the beam directed towards the device 104. After adjusting the antennas 124, the access point 102 may use the antennas 124 to transmit messages to the device 104.

Figure 6:
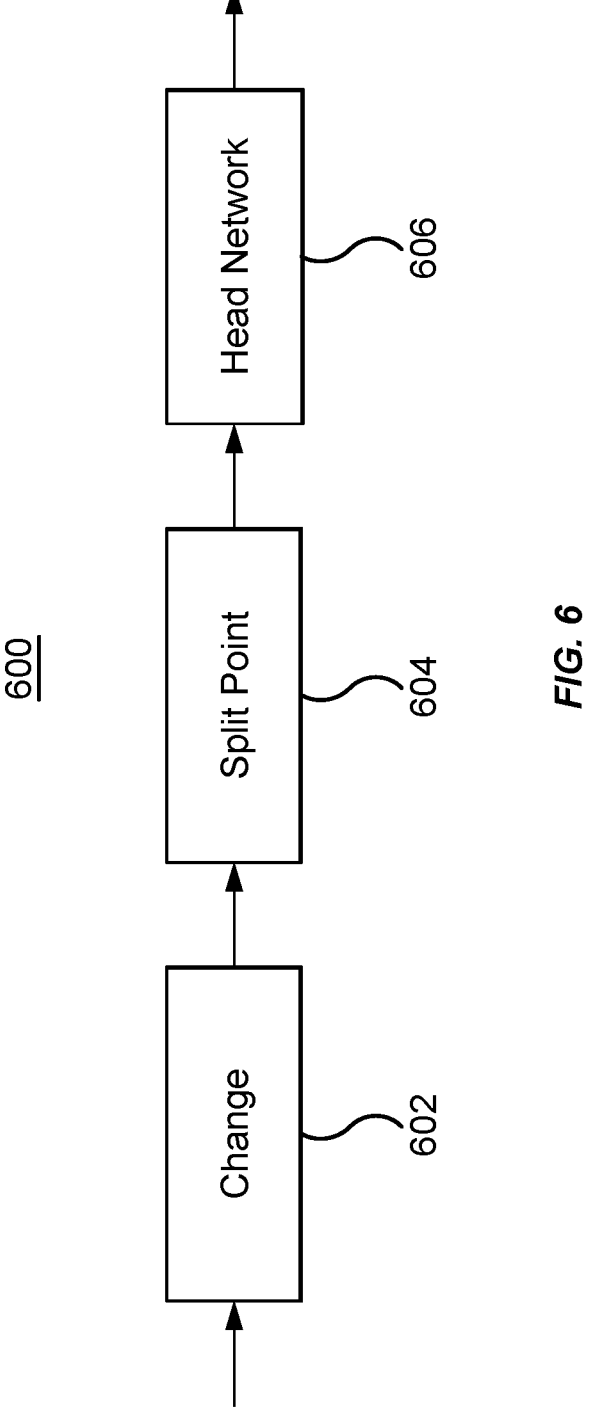
FIG. 6 illustrates an example operation performed by the system of FIG. 1A.

FIG. 6 illustrates an example operation 600 performed by the system 100 of FIG. 1A. Generally, the access point 102 performs the operation 600. By performing the operation 600, the access point 102 adjusts the portions of the neural network 206 implemented by the access point 102 and the device 104.

The access point 102 begins by determining a change 602 that occurred in the network or in the device 104. For example, the device 104 may inform the access point 102 about a change in the computational resources available to the device 104. The device 104 may have initiated additional operations that reduce the computational resources available to the device 104. As another example, the access point 102 may detect additional congestion on the network, which reduces the amount of network resources or transmission rate for the network.

The access point 102 determines a split point 604 that accommodates the changes 602. For example, the access point 102 may determine the split point 604 that changes the number of layers of the neural network 206 that should be implemented by the device 104. If the device 104 indicates that fewer competing resources are available to the device 104 or if the access point 102 determines that fewer network resources are available, then the access point 102 may determine the split point 604 such that the device 104 implements fewer layers of the neural network 206. On the other hand, if the device 104 indicates that more computational resources are available to the device 104 or if the access point 102 determines that additional network resources are available, then the access point 102 may determine the split point 604 such that the device 104 implements additional layers of the neural network 206.

The access point 102 determines the head network 606 according to the split point 604. The head network 606 may include the layers of the neural network 206 from the initial layer to the split point 604. The access point 102 then communicates the head network 606 to the device 104. The device 104 may implement the head network 606 to generate new intermediate CSI for the access point 102. In this manner, the access point 102 may adjust or change the number of layers of the neural network 206 implemented by the device 104 according to changes in the device 104 or in the network.

Figure 7:
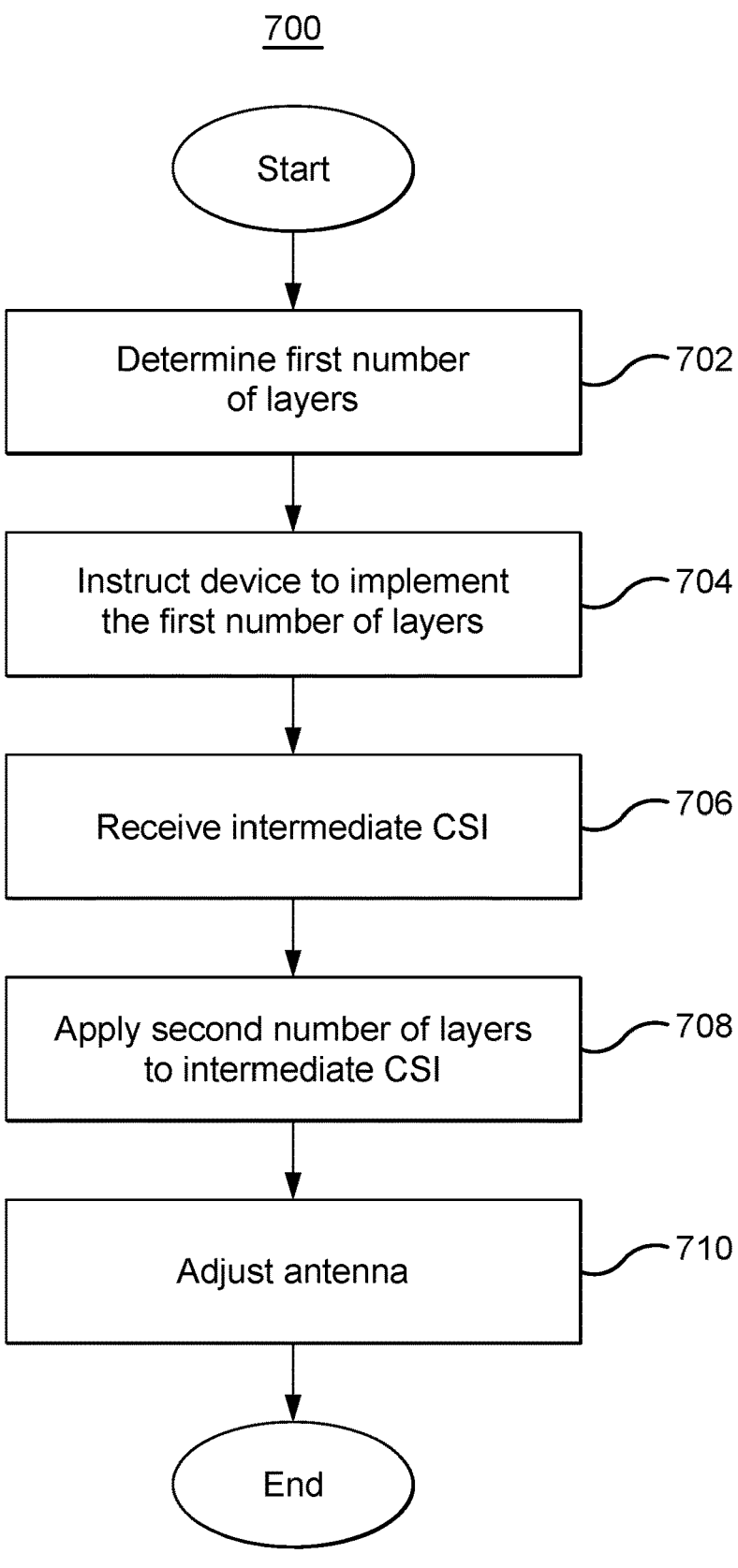
FIG. 7 is a flowchart of an example method performed by the system of FIG. 1A.

FIG. 7 is a flowchart of an example method 700 performed by the system 100 of FIG. 1A. In particular embodiments, the access point 102 performs the method 700. By performing the method 700, the access point 102 dynamically divides the operations and computations needed to generate the beamforming feedback matrix 402 between the access point 102 and the device 104.

In block 702, the access point 102 determines a first number of layers of the neural network 206 that should be implemented by the device 104. The access point 102 may determine the first number of layers according to the computational resources 202 available to the device 104, the size 204 of the CSI matrix for the connection between the access point 102 and the device 104, and/or the transmission rate 214 of the network. Generally, the more computational resources 202 that are available to the device, the smaller the size 204 of the CSI matrix, and/or the higher the transmission rate 214, the more number of layers of the neural network 206 that the access point 102 determines should be implemented by the device 104.

In block 704, the access point 102 instructs the device 104 to implement the first number of layers of the neural network 206. The access point 102 may also communicate the first number of layers of the neural network 206 to the device 104 as the head network 210. The access point 102 may implement the remaining number of layers of the neural network 206 as the tail network 212.

In block 706, the access point 102 receives the intermediate CSI 304 from the device 104. The device 104 may generate the intermediate CSI 304 by applying the first number of layers of the neural network 206 to the CSI 302 for the communication medium between the access point 102 and the device 104. The intermediate CSI 304 may be the output of the first number of layers of the neural network 206.

In block 708, the access point 102 applies a second number of layers of the neural network 206 to the intermediate CSI 304. The second number of layers may be the remaining number of layers of the neural network 206 that were not communicated to the device 104 as the head network 210. The access point 102 may implement the second number of layers of the neural network 206 as the tail network 212. The second number of layers of the neural network 206 may output the beamforming feedback matrix 402.

In block 710, the access point 102 adjusts the antennas 124 of the access point 102 according to the beamforming feedback matrix 402. The beamforming feedback matrix 402 may indicate a configuration of the antennas 124 of the access point 102 to form a beam directed towards the device 104. For example, the beamforming feedback matrix 402 may indicate a phase of signals, relative amplitude of signals, and/or a direction or orientation of the antennas 124 of the access point 102. The access point 102 may adjust the antennas 124 according to the beamforming feedback matrix 402 to form one or more beams directed to the device 104.

In summary, the access point 102 dynamically divides the computation of a beamforming feedback matrix between the access point 102 and a device 104. Generally, the access point 102 determines the anticipated size of a CSI matrix for a communication channel between the access point 102 and the device 104 (e.g., based on the number of antennas in the access point 102 and the device 104), and the device 104 informs the access point 102 of the computational resources available in the device 104. The access point 102 then determines how many layers of a neural network should be implemented by the device 104 and how many layers of the neural network should be implemented by the access point 102. The device 104 uses its number of layers to analyze CSI to produce intermediate (or compressed) CSI for the access point 102. The access point 102 uses its number of layers to analyze the intermediate CSI to produce the beamforming feedback matrix. The access point 102 may then adjust antennas based on the beamforming feedback matrix.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point comprising:
an antenna;
one or more memories; and
one or more processors communicatively coupled to the one or more memories, a combination of the one or more processors configured to:
determine a first number of layers of a neural network to be implemented by a device based on (i) a size of a channel state information (CSI) matrix for the device and the access point and (ii) computational resources of the device;

instruct the device to implement the first number of layers of the neural network;
receive, from the device, intermediate CSI produced by the first number of layers of a neural network implemented by the device;
apply, to the intermediate CSI, a second number of layers of the neural network to produce a beamforming feedback matrix; and
adjust the antenna based on the beamforming feedback matrix.

2. The access point of claim 1, wherein the combination of the one or more processors is further configured to:
change the first number of layers to a third number of layers based on a change in a computational power of the device; and
instruct the device to implement the third number of layers.

3. The access point of claim 1, wherein the first number of layers is determined further based on a transmission rate between the device and the access point.

4. The access point of claim 1, wherein a total number of layers of the neural network is a sum of the first number of layers and the second number of layers.

5. The access point of claim 1, wherein the second number is larger than the first number.

6. The access point of claim 1, wherein the combination of the one or more processors is further configured to transmit a message to the device based on the beamforming feedback matrix.

7. The access point of claim 1, wherein the combination of the one or more processors is further configured to communicate the first number of layers to the device.

8. A method comprising:
determining, by an access point, a first number of layers of a neural network to be implemented by a device based on (i) a size of a CSI matrix for the device and the access point and (ii) computational resources of the device;
instructing, by the access point, the device to implement the first number of layers of the neural network;
receiving, from the device, intermediate CSI produced by the first number of layers of a neural network implemented by the device;
applying, by the access point and to the intermediate CSI, a second number of layers of the neural network to produce a beamforming feedback matrix; and
adjusting, by the access point, an antenna based on the beamforming feedback matrix.

9. The method of claim 8, further comprising:
changing the first number of layers to a third number of layers based on a change in a computational power of the device; and
instructing the device to implement the third number of layers.

10. The method of claim 8, wherein the first number of layers is determined further based on a transmission rate between the device and the access point.

11. The method of claim 8, wherein a total number of layers of the neural network is a sum of the first number of layers and the second number of layers.

12. The method of claim 8, wherein the second number is larger than the first number.

13. The method of claim 8, further comprising transmitting a message to the device based on the beamforming feedback matrix.

14. The method of claim 8, further comprising communicating the first number of layers to the device.

15. A system comprising:

a device; and an access point configured to:

determine a first number of layers of a neural network to be implemented by the device based on (i) a size of a CSI matrix for the device and the access point and (ii) computational resources of the device;

instruct the device to implement the first number of layers of the neural network;

wherein the device is configured to:

apply the first number of layers of the neural network to CSI for a communication channel between the device and the access point to produce intermediate CSI; and communicate the intermediate CSI to the access point; and wherein the access point is further configured to:

apply, to the intermediate CSI, a second number of layers of the neural network to produce a beamforming feedback matrix; and adjust an antenna of the access point based on the beamforming feedback matrix.

16. The system of claim 15, wherein the first number of layers is determined further based on a transmission rate between the device and the access point.

17. The system of claim 15, wherein a total number of layers of the neural network is a sum of the first number of layers and the second number of layers.

* * * * *